Dec. 18, 1956 P. A. GROBEY 2,774,192
MACHINE TOOL CYCLE CONTROL
Filed June 28, 1954 4 Sheets-Sheet 1

Inventor
Paul A. Grobey
by
Wright, Brown, Quinby & May
Attys.

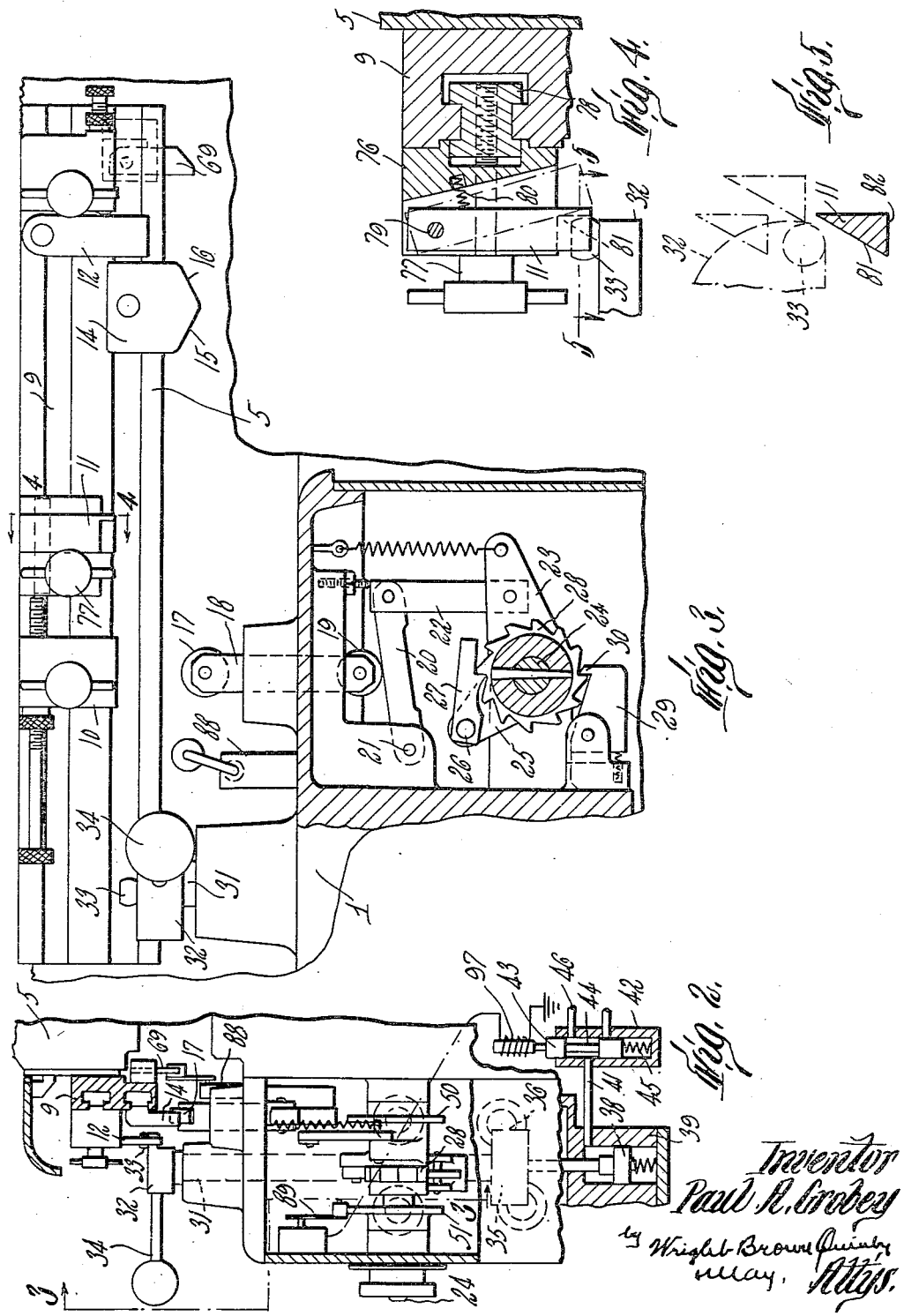

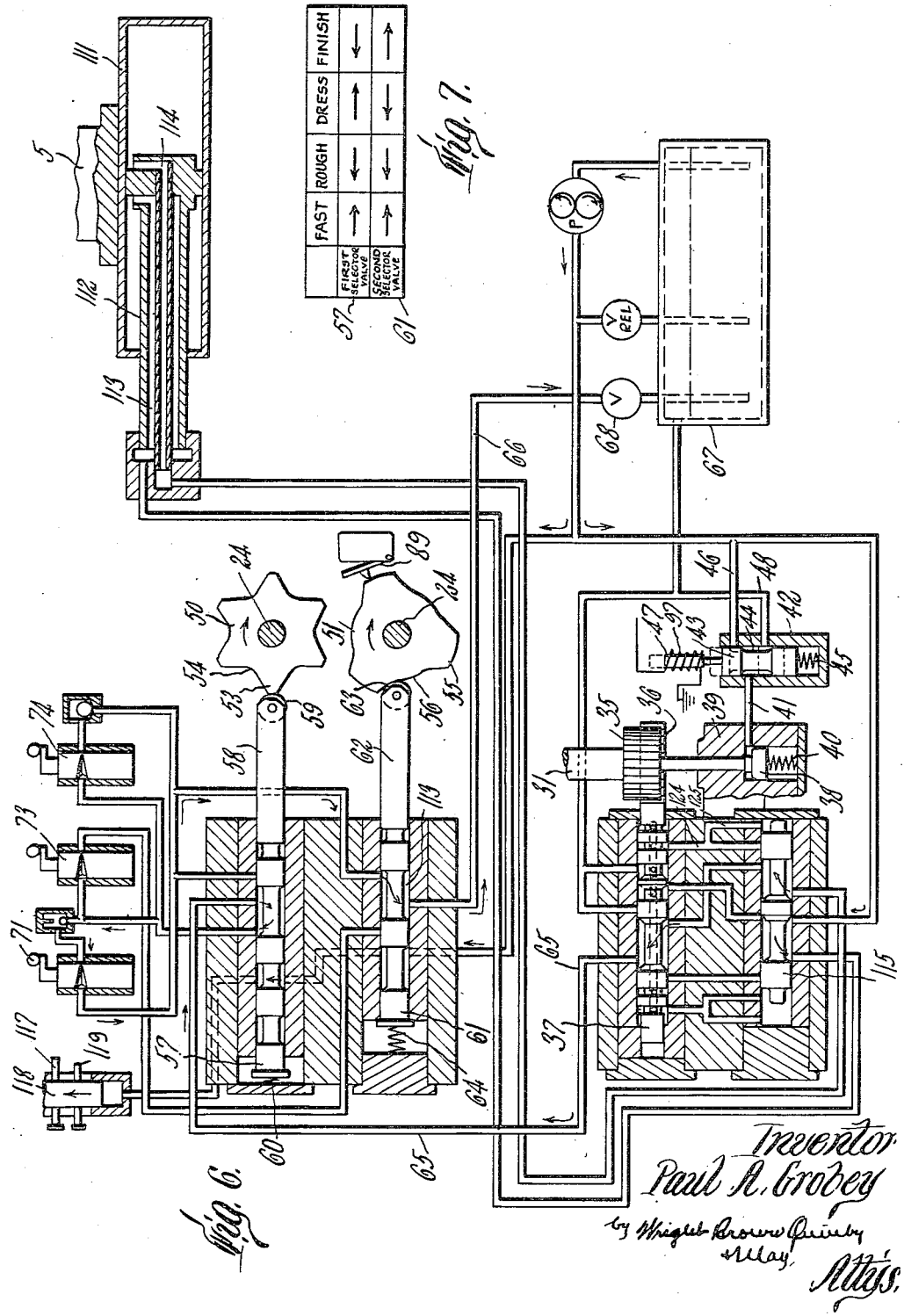

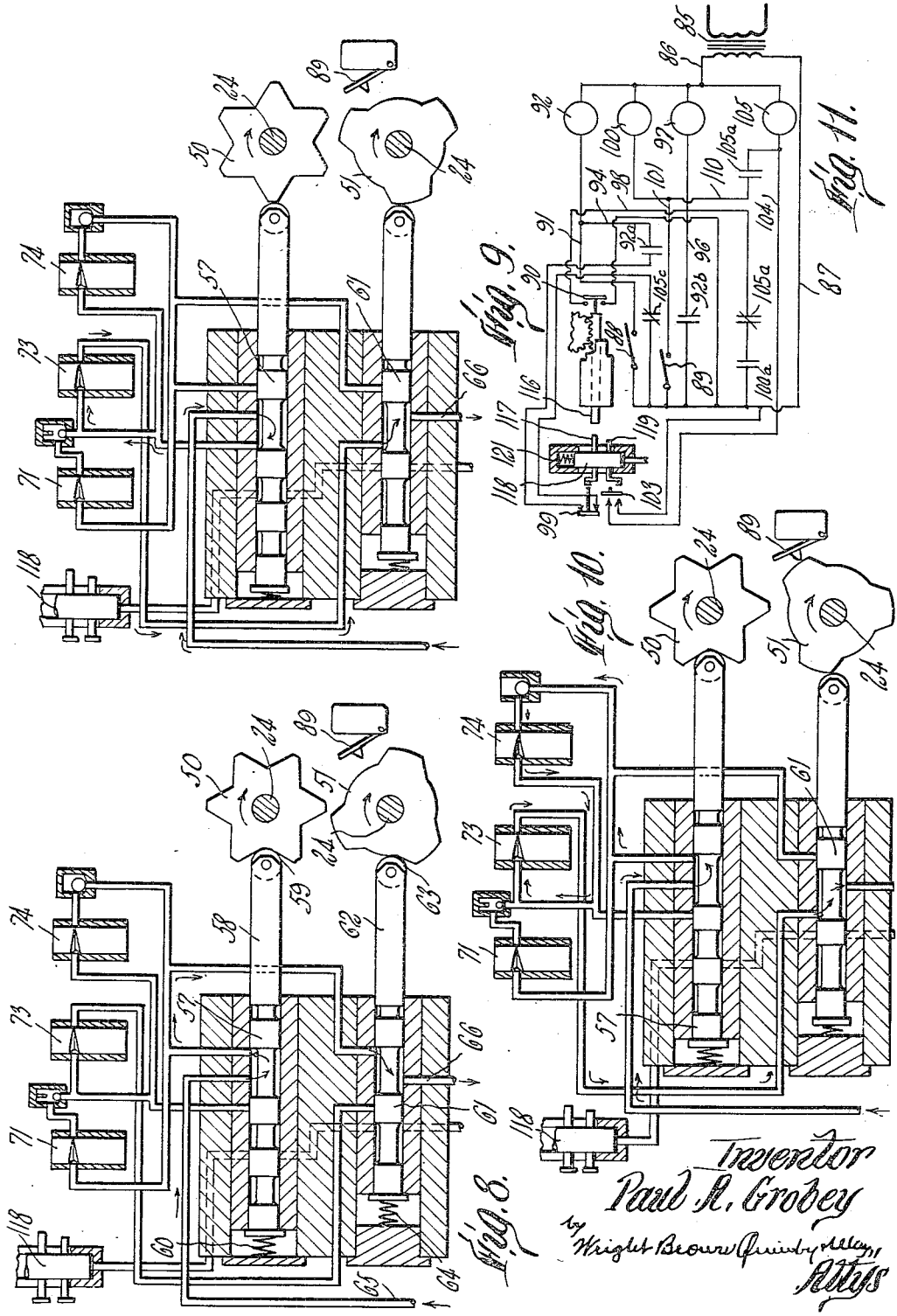

United States Patent Office 2,774,192
Patented Dec. 18, 1956

2,774,192
MACHINE TOOL CYCLE CONTROL

Paul A. Grobey, Springfield, Vt., assignor to Bryant Chucking Grinder Company, Springfield, Vt., a corporation of Vermont Application June 28, 1954, Serial No. 439,721

11 Claims. (Cl. 51—50)

This invention relates to machine tools and more particularly to grinding machines and has for an object to simplify the controls of the steps of an automatic or semi-automatic cycle of operations such, for example, as in an internal grinding machine having the steps of: (1) "fast traverse motion" for introducing and retracting the tool to and from the work zone; (2) rough grinding; (3) wheel dressing, and (4) finish grinding.

A further object is to effect the changes from one to the other of such steps and condition the machine for the next step by positive means governed from the carriage by which the wheel and work are relatively traversed.

Still a further object is to introduce a mechanism that is simple and rugged but at the same time is versatile and flexible to allow for quick changes from one work setup to another as well as changes in sequence of steps in the cycle.

Further objects and advantages will appear from a description of an embodiment of the invention shown in the accompanying drawings in which Fig. 1 is a somewhat diagrammatic front elevation of an internal grinding machine embodying the invention, the machine being at rest in loading position and conditioned for fast traverse motion;

Fig. 2 is a detail sectional view to a larger scale on line 2—2 of Fig. 1;

Fig. 3 is a view partly in front elevation and partly in section on line 3—3 of Fig. 2;

Fig. 4 is a detail sectional view on line 4—4 of Fig. 3;

Fig. 5 is a somewhat schematic view of the escapement feature of the stop illustrated in Fig. 4;

Fig. 6 is a diagram of the hydraulic system and the step controlling mechanism shown in position when the machine is conditioned for the finish grinding step;

Fig. 7 is a diagram showing the positions of the selector valves for various steps of the cycle;

Fig. 8 is a diagram showing the step controlling mechanism of Fig. 6 in position to condition the machine for fast motion;

Fig. 9 is similar to Fig. 8 but showing the mechanism conditioned for rough grinding;

Fig. 10 is similar to Figs. 8 and 9 but showing the mechanism conditioned for wheel dressing;

Fig. 11 is an electric diagram of the control circuit.

Figure 1:
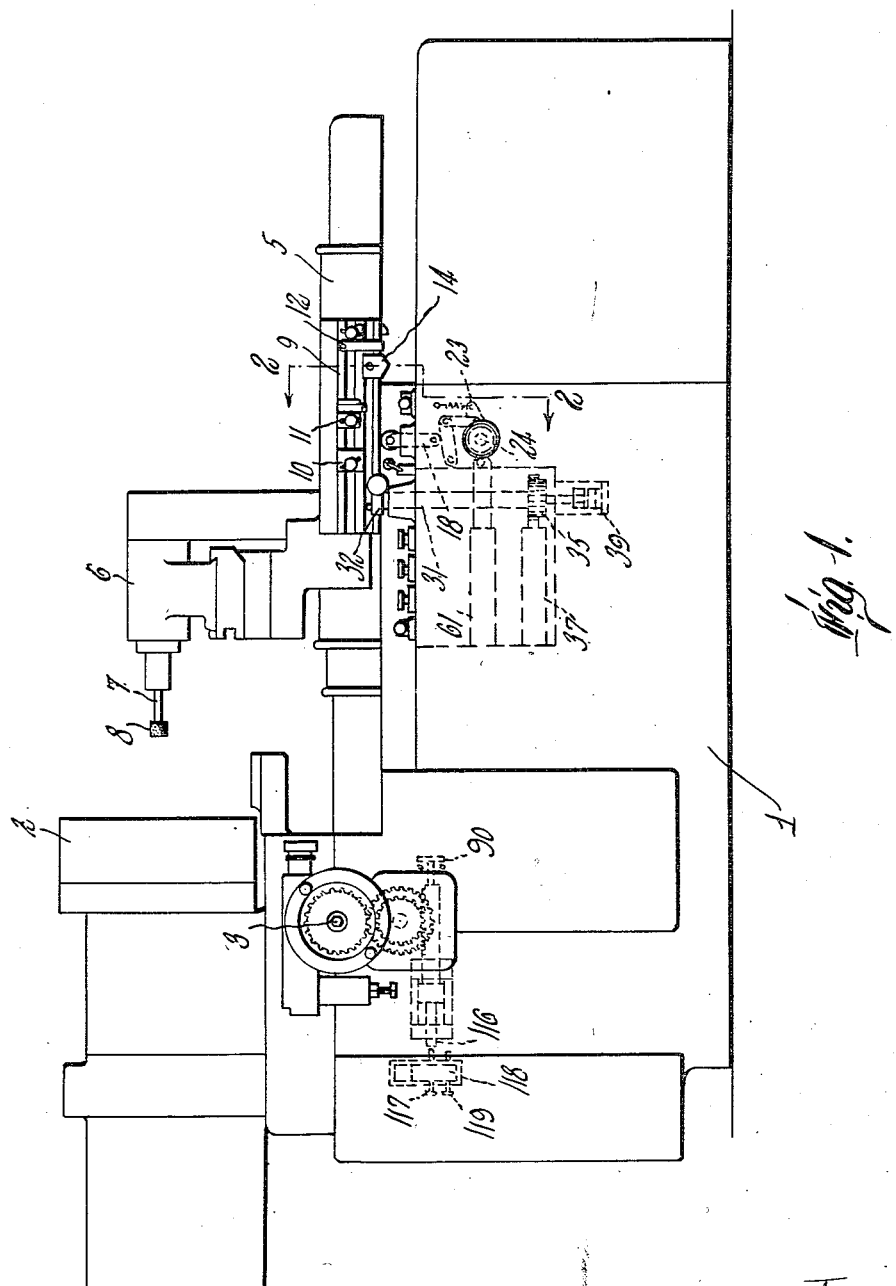

Referring first to Fig. 1, shown at 1 is a bed on which at the left is located a cross slide 2 arranged to impart a transverse or feed movement between the work and tool. The work, held in a chuck or other means, is caused to rotate with the headstock spindle. The transverse movement is imparted by rotating a feed screw 3 actuated by suitable means such as gearing, and an hydraulic cylinder. Such means of itself forms no part of this invention. The positions of the parts are those when the headstock in its retracted position or, in other words, when the work piece and tools are separated in transverse relationship to allow the tool to enter or withdraw from the work without contacting each other at the start of a cycle.

On the part of bed 1 to the right is a slide means for a carriage 5 on which is mounted a tool holder 6 having journaled therein a rotatable spindle 7 provided with a grinding wheel 8.

The carriage 5 is moved in its rectilinear path by hydraulic mechanism through different ranges such as the actual grinding stroke, an extended stroke for allowing dressing of the wheel by a diamond tool or the like, and a still more extended stroke to completely retract the carriage from the working area allowing for removal of a finished work piece and the introduction of an unfinished one, all phases of operating cycles well known in the art.

As shown in Fig. 6, the hydraulic mechanism may comprise a cylinder 111 carried by the carriage 5 within which is a piston 112, fluid under pressure being admitted to the cylinder on one side of the piston while being discharged from the other side as through passages 113 and 114 through the piston rod. These passages 113 and 114 with connecting pipes lead to valve mechanism within a reversing valve casing containing a reciprocable reversing valve 115 and a pilot valve 37.

Certain of the controls for effecting and governing said operations are shown in Figs. 1 and 3, comprising reciprocating laterally alined range-limiting stops or dogs 10, 11 and 12 adjustably secured in ways 9 on the carriage 5. Cooperating with these stops or dogs is a lug 33 eccentrically disposed on the head 32 of a rockable and axially movable control shaft 31. This control shaft has two axial positions: a lower one out of possible engagement with stops 10 and 11, but in position to be contacted by the stop 12 when the carriage 5 retracts to a determined point and another higher for engagement by stops 10, 11 and 12. The range of grinding stroke lies between stops 11 and 12, the extended dressing stroke between stops 10 and 11, and finally the extended retracting stroke between the stop 12 and the extreme position of the carriage in the direction of stop 12 away from head 32. The stops 10 and 12 form in their adjusted positions positive limits for the travel of the carriage when the lug 33 on the head 32 is engaged by said stops, thereby imparting a rocking motion of control shaft 31, causing a sequence of events, the consequence of which is the reversing of the direction of the travel of the carriage as is well known in the art. The stop 11, on the other hand, differs from prior constructions in that when the carriage and the stop 11 approach the head 32 from the left (from above as viewed in Figure 3), the stop 11 acts as a positive reversing stop, but when the carriage and stop approach from the right (from below as viewed in Figure 5), this stop yields and passes the head 32 without impressing any rocking motion on the control shaft 31.

Referring to Figures 4 and 5, there is shown the arrangement of the limiting stop or dog 11. A block 76 is adjustably located in way 9 of carriage 5 by means of screw 77 and nut 78. In the block 76 is fulcrumed at 79 the stop 11 normally held by spring 80 in the position shown by full lines. The lower end of dog 11 has on its front face an inclined portion 81 starting close to the right edge 82 and sloping away to the left as indicated in Fig. 5. Considering the latter figure, it will be clear that when the carriage is traveling toward the right during the grinding phases, the face 82 will eventually engage the lug 33 (shown in Figure 5), causing a rocking movement of the associated shaft 31. On the other hand, when the dog 11 approaches the lug 33 during a leftward movement as during the dressing phase, the inclined face portion 81 will cause the dog to yield as indicated by upward motion in Fig. 5 and take a position shown in dash-dot lines in Fig. 4 passing freely by the lug 33 without moving it.

Also adjustable lengthwise of and on the carriage is a cycle programming cam 14 having oppositely disposed inclined cam faces 15 and 16 which at suitable axial positions of the carriage engage a follower roll 17 (see Figures 2 and 3) in one end of an axially movable bar 18 slidably guided in the machine bed and having at its other end a roller 19 bearing upon an arm 20. The arm 20 is fulcrumed at 21 and its free end is pivotally connected through a link 22 to the arm 23. This arm 23 extends from a hub rockably journaled on shaft 24. Also extending from said hub is an arm 25 on which at 26 is pivoted the pawl 27. This pawl 27 cooperates with the teeth of a ratchet wheel 28 secured to shaft 24. These parts as shown are arranged so that as either of the faces 15 and 16 of cam 14 engages the roller 17 and depresses it, the ratchet wheel 28 is correspondingly turned, turning the shaft and the cams associated therewith a predetermined amount and in the embodiment shown through a step of 30°. A spring-pressed locking pawl 29 prevents reverse rotation of the ratchet wheel by means of a lip 30 which engages the steep faces of the ratchet but rides freely along the inclined faces thereof. This mechanism has for its purpose to control the position of valves 57 and 61 in a certain programmed sequence as will later appear. These valves act first to determine the speed of traverse of the carriage and secondly to govern sundry auxiliary functions of the machine cycle. Such possible functions may be to serve as pilot valves for stopping and starting the headstock, the flow of coolant to the work, and/or to present and retract the dressing tool at proper times.

The limits of the traverse of the carriage for each step of the machine cycle are determined by the reversing dogs 10, 11 and 12 and their effect on the rockable shaft 31. This shaft 31 has at its upper end a head 32 from which projects a handle 34 for a purpose which will appear later. Extending from the head 32 is eccentrically located lug 33 (see Figure 2) which is engaged by the dogs 10, 11 and 12 in a programmed sequence of the machine cycle. Such engagement will cause the shaft 31 to rock and the pinion 35 (see Figure 6) on said shaft being in engagement with rack 36 of valve spool 37 will cause said valve spool to shuttle from one position to another. The position of this valve spool governs the direction of the carriage travel as produced by hydraulic means known in the art.

At the opposite end of the shaft 31 from the head 32 is a piston part 38 slidable in an hydraulic cylinder 39 containing spring means 40, the two being utilized to impart an axial movement to the shaft 31, the hydraulic means working against the spring means moving and holding shaft 31 in a definite "low" position, and the spring means lifting and holding shaft 31 in a definite "high" position when the hydraulic pressure is removed. It is noted that pinion 35 has such a width that it remains in contact with rack 36 at both axial positions of shaft 31.

To cause the shaft 31 to move downwardly against the spring 40, fluid pressure is introduced above the piston 38 through a pipe 41 leading from a three-way valve 42, having a valve spool 43 with the annular port 44. The valve spool is normally held in its upper position by a spring 45 as shown in dotted lines in Fig. 6. When the valve spool is in this position, pressurized fluid is supplied from pipe 46 through port 44, pipe 41 above the piston 38, thereby depressing the shaft 31 to its low position. Valve spool 43 is connected to the armature 47 of a solenoid 97. When this solenoid is energized, it moves the valve spool 43 to the position shown in full lines, whereby the fluid above piston 38 is exhausted through pipe 41, port 44, pipe 48 and the resultant pressure drop allows the spring 40 to raise the shaft 31 to its high position.

The shaft 24 as shown in Fig. 2 has fixed thereto a pair of cams 50 and 51. The cam 50 has six lobes 53 with interposed low portions 54. The cam 51 has three lobes 55 with interposed low portions 56. The interrelationship of the cams 50 and 51 and the valves governed by them is somewhat diagrammatically shown in Figs. 6, 8, 9 and 10. Cam 50 actuates what is here called the "first selector valve" 57 having an extension 58 with a follower roller 59, this roller being held in contact with cam 50 by spring means 60. The cam 51 actuates the "second selector valve" 61 having an extension 62 with a follower 63 held in contact with cam 51 by spring means 64. Fig. 7 supplements Figs. 6, 8, 9 and 10 and illustrates the respective positions of the time selector valves by arrows.

The function of the various valves and their actuating means may best be explained by following through the steps of a cycle of operations of a machine here shown as an internal grinder. As a normal cycle, the following sequential steps are chosen as named: (1) fast; (2) rough grinding; (3) dressing, and (4) finish grinding. Considering now that the machine is in position shown in Fig. 1, with the carriage 5 at rest in its extreme right position, the cam mechanism has the position as shown in Fig. 8 and in the "fast" column of Fig. 7. The handle 34 is manually rocked toward the left and the carriage starts moving toward the left at a high speed determined by the position of the selector valves 57 and 61, allowing the exhaust side of the hydraulic carriage traversing cylinder 111 to empty fast, thereby exerting a minimum of throttling effect. This is shown by arrows indicating the flow in Fig. 8. It will be noted from Fig. 6 that the discharge from the carriage controlling pilot valve 37 in each position is conveyed through pipe 65 to the selector valve system and pipe 66, returns under low back pressure established by throttle valve 68 to the tank 67 of a hydraulic pressure system. As the carriage advances to the left, the adjustable dog 14 aproaches and its face 15 engages the roller 17, passes over it and depresses the bar 18 and causes the cam shaft 24 to rotate one step, thereby conditioning the machine for the rough grinding phase of the cycle by positioning the selector valves 57 and 61 as shown in Fig. 9 and in the "rough" column of Fig. 7. It is observed that the dog 14 is in position to actuate the stepping mechanism when the lug 33 on head 32 of shaft 31 is to the right of the dog 11, and that a dog 69 on the carriage which is moved thereby contacts and closes a limit switch 88 on the bed. This energizes the solenoid 97 causing the valve 44 to take the full line position of Figure 3, discharging the fluid from the above piston 38 and causes the shaft 31 to be raised to its high position by the spring 40 with the effect that the carriage will reciprocate in a range determined and limited by the dogs 11 and 12. Again referring to Fig. 9, it is noted from the flow indicating arrows that the new positions of selector valves 57 and 61 cause the discharging fluid to flow through the adjustable throttle valve 73 which regulates the reciprocating speed of the carriage to a sutiable value for rough grinding.

When the rough grinding phase is terminated as will later appear, the solenoid 97 is de-energized by opening of switch 90 with the result that shaft 31 is depressed to its lower position, allowing lug 33 to pass under dog 11 and thereby initiate a limited extended stroke of the carriage toward the right. This causes face 16 of cam 14 to engage roller 17 and step the shaft 24 and cams 50 and 51 to their next angular position and thereby positioning valves 57 and 61 as shown in Fig. 10 and the "dress" column of Fig. 7. One lobe of cam 51 now closes normally open switch 89, re-energizing solenoid 97 and again raises shaft 31 to its upper position at a moment when lug 33 is to the left of dog 11. From the flow indicating arrows in Fig. 10, it is shown that the discharging fluid now meets a further restraining obstacle by passing through the adjustable throttling valve 73 achieving the intended purpose of a suitable slow movement of reciprocation of the carriage during this dressing phase. The carriage travels toward the right till dog 10 strikes the lug 33 and the direction of the carriage is changed to leftward movement. In this directional movement, the dog 11 does not constitute any obstacle to lug 33, but is rocked into the dotted line position of Fig. 4 and the carriage continues toward the left again, placing the lug 33 in the grinding zone between dogs 11 and 12.

When the dog 11 on the carriage is passing the lug 33, the face 15 of the dog 14 again passes over the roller 17 and the stepping mechanism is actuated, advancing cams 50 and 51 one step, thereby positioning valves 57 and 61 as in Fig. 6, conditioning the machine for the finsh grind phase of the cycle. Switch 89 is still held closed by cam 51 and consequently the shaft 31 retains its upper position. Following the direction indicating arrows, it is observed that the discharging fluid is passed through the adjustable throttle valve 71, allowing a reciprocatory speed suitable for the finish grind step.

When the finish grind phase is terminated as will later appear, the solenoid 97 is de-energized with the result that shaft 31 is depressed to its lower position allowing lug 33 to pass under dog 11, initiating an extended stroke of the carriage toward the right. This causes the face 16 of the dog 14 to engage the roller 17 and actuates the stepping mechanism, advancing cams 50 and 51 one step, thereby conditioning the machine to the position described in connection with Fig. 8. Whenever the holding circuit made by switch 89 is broken the shaft 31, retaining its lower position, passes under the dog 10 and permits the carriage to travel to its extreme right hand position where it stops and remains till handle 34 is again rocked as previously described.

Means known in the art for terminating the roughing and finish grind phases of the cycle is disclosed, for example, in United States Letters Patent to Ljunggren No. 2,502,862. Referring to the diagram, Fig. 11, there is shown a normally closed switch 90 which is held open when the transversely movable slide for the headstock is in its retracted position, but is closed when the transverse or feeding movement starts. Said switch can be actuated directly by the headstock slide, but it is desirable to have a great degree of amplification. Therefore an extension of the feed cylinder piston in such patent disclosures is chosen, this extension forming the actuating means for said switch 90.

The feed cylinder piston 116 is positioned to engage a relative long stop 117 in a vertically movable plunger 118 at the end of a rough grinding step, and to advance further during a finish grinding step to engage a shorter stop 119 at the end of the finish grind. Pressure against the stop 117 opens the switch 99 and pressure against the stop 119 closes the switch 103. The plunger 118 is normally in its lowered position, being there held as by a spring 121 during the rough grinding step, but for the finish grinding step it is lifted to its upper position by fluid pressure entering beneath it past the valves 57 and 61 as shown in Fig. 6. In the rough grinding positions of these valves, this pressure is cut off by the valve 61 as shown in Fig. 9.

The wiring diagram, Fig. 11, shows that part of the electric control circuit which concerns this invention. The secondary of a transformer 85 furnishes the suitable potential through leads 86 and 87. The normally open limit switch 88, the location of which is best shown in Figs. 2 and 3, is actuated by a dog 69 on the carriage 5 arranged in such a way that this actuation only takes place when the wheel slide moves toward the left. The normally open limit switch 89 is located as best shown in Fig. 2 in such a way as to be actuated by the lobes of cam 51. This is actuated and closed by a lobe of cam 51 in Figs. 6 and 10 and open in Figs. 8 and 9. The normally closed limit switch 90 is shown as located in a way to be opened by an extension of the feed piston indicated on Fig. 1.

When now the wheel slide is advancing in the direction to the left from its position in Figs. 1 and 3, the dog 69 momentarily closes limit switch 88, thereby through lead 91 energizes the coil 92 of a control relay causing contact 92a to close and with lead 94 form a holding circuit for coil 92. At the same time, contact 92b is closed, which, by way of lead 96, energizes solenoid 97. It will be observed that limit switch 90 is at this time held open. When solenoid 97 is energized, certain events take place as before described in connection with hydraulic diagrams, Figs. 6, etc. The feed piston in Figure 1 has now also started to travel toward the left, and as a result limit switch 90 takes its normally closed position and forms a holding circuit for the solenoid 97 by way of lead 98. The circuit is now conditioned for the rough grinding step of the cycle and will continue till the wheel dressing step is initiated. The switch 99 opens at the termination of the rough grinding and breaks the holding circuit for control relay coil 92 and the limit switch 90 again opens at retraction of the feed piston. The result is that the solenoid 97 is de-energized, conditioning the machine for the extended wheel dressing step, the cam 51 closing limit switch 89, holding it closed during the dressing step and the following finish grind step. With the limit switch 89 closed, and the coil of the control relay 100 is energized by way of lead 101 and, in consequence thereof, switch 100a is closed forming a holding circuit and energizing the solenoid 97 during wheel dressing and finish grinding steps. Again when the finish grinding step is discontinued, the switch 103 closes and by way of lead 104 energizes the coil 105 of a control relay causing switch 105a to close, forming a holding circuit for coil 105 through lead 110 and at the same time opens switch 105b breaking the holding circuit for the relay coil 100 through lead 98 and also by opening switch 105c, de-energizing the control relay 92, thereby de-energizing solenoid 97. The circuit is now conditioned for the fast motion step as switch 90 opens.

It will be noted that the cycle of operation of the machine is controlled jointly by the hydraulic valves as controlled by the cams on the shaft 24 and the electric switches controlled by the position of the work carriage at the ends of the grinding steps of the cycle.

From the foregoing description of an embodiment of this invention, it should be evident to those skilled in the art that various changes and modifications may be made therein without departing from its spirit or scope.

I claim:

1. A grinding machine comprising members including a bed and a carriage mounted on said bed for rectilinear motion, means for supporting a work piece on one of said members, means for supporting a grinding wheel on the other of said members, means for reciprocating said carriage, means for relatively moving said members for relative feed of said wheel and work piece transverse to the direction of reciprocation, means for controlling the relative motions of said members in a predetermined cycle, said means including a rotary shaft, means controlled by certain of the relative motions of said members for turning said shaaft by definite angular distances, and means controlled by the angular positions of said shaft for controlling the relative motions of said members in predetermined sequence, including a grinding step, means effective during such grinding step to actuate said feed relative moving means, and said machine including means actuated by a predetermined limit of feed to terminate said grinding step.

2. A grinding machine comprising members including a bed and a carriage mounted on said bed for rectilinear motion, means for supporting a work piece on one of said members, means for supporting a grinding wheel on the other of said members, means for reciprocating said carriage, means for relatively moving said members for relative feed of said wheel and work piece transverse to the direction of reciprocation, means for controlling the relative motions of said members in a predetermined cycle, said means including a rotary shaft, means controlled by certain of the relative motions of said members for turning said shaft by definite angular distances, and means controlled by the angular positions of said shaft for controlling the relative motions of said members in predetermined sequence, including a plurality of grinding steps, means effective during such grinding steps to actuate said feed relative moving means, and said machine including means actuated by predetermined limits of feed to terminate said grinding steps and to condition said machine for the next following steps of the cycle.

3. A grinding machine comprising members including a bed and a carriage mounted on said bed for rectilinear motion, means for supporting a work piece on one of said members, means for supporting a grinding wheel on the other of said members, means for reciprocating said carriage, means for relatively moving said members for relative feed of said wheel and work piece transverse to the direction of reciprocation, means for controlling the relative motions of said members in a predetermined cycle, said means including a rotary shaft, means controlled by certain of the relative motions of said members for turning said shaft by definite angular distances, and means controlled by the angular positions of said shaft for controlling the relative motions of said members in predetermined sequence, including a grinding step, means effective during such grinding step to actuate said feed relative moving means, said machine including means actuated by a predetermined limit of feed to terminate said grinding step, said machine also including means for independently determining the rate of a relative motion between said members in each of said steps.

4. A grinding machine comprising members including a bed and a carriage mounted on said bed for rectilinear motion, means for supporting a work piece on one of said members, means for supporting a grinding wheel on the other of said members, means for reciprocating said carriage, means for relatively moving said members for relative feed of said wheel and work piece transverse to the direction of reciprocation, means for controlling the relative motions of said members in a predetermined cycle, said means including a rotary shaft, means controlled by certain of the relative motions of said members for turning said shaft by definite angular distances, means controlled by the angular positions of said shaft for controlling the relative motions of said members in predetermined sequence, including a plurality of grinding steps, means effective during such grinding steps to actuate said feed relative moving means, and said machine including means actuated by predetermined limits of feed to terminate said grinding steps and to condition said machine for the next following steps of the cycle, said machine also including means for independently determining the rate of a relative motion between said members in each of said steps.

5. A machine of the class described comprising a reciprocable carriage, three dogs depending from said carriage to different extents and positioned to limit the travel of said carriage, means for reciprocating said carriage, a rockable shaft having two axial positions in one of which one of said dogs acts to limit the travel of said carriage in one direction and in the other of which said dogs limit said carriage motion in both directions, the third dog positioned to limit said travel in one direction, means supporting said third dog constructed and arranged to permit said dog to yield in one direction to permit passing of said carriage in the opposite direction in the one position of said shaft, and means for moving said shaft from one to the other of said axial positions, the rocking of said shaft acting on said reciprocating means to reverse the direction of travel of said carriage in each of said axial positions.

6. A machine comprising a bed, a work carriage having a rotary work spindle, a tool carriage mounted on said bed for rectilinear motion in the general direction of the axis of said spindle, means supporting said work carriage on said bed for motion transverse to said axis, a program control shaft, means actuated by motion of said tool carriage at predetermined portions of its stroke for turning said shaft by predetermined angular distances, cams on said shaft, hydraulic valves controlling said moving means and controlled by the angular positions of said cams, electrical means controlled by the position of said work carriage, and mechanism controlled jointly by said hydraulic valves and electrical means determining a cycle of operations of said machine.

7. A machine comprising a bed, a work carriage having a rotary work spindle, a tool carriage mounted on said bed for rectilinear motion in the general direction of the axis of said spindle, said work carriage being supported on said bed for motion transverse to said axis, a program control shaft, means actuated by motion of said tool carriage at predetermined portions of its stroke for turning said shaft by predetermined angular distances, a pair of cams carried by said shaft, a pair of reciprocable valves engaging said cams and controlled in their axial positions by the angular positions of said control shaft, other means controlled by the position of said work carriage, and mechanism controlled jointly by said valves and other controlling means determining a cycle of operations of said machine.

8. A grinding machine comprising a bed, a work carriage having a rotary work spindle, a grinding wheel carriage mounted on said bed for rectilinear motion in the general direction of the axis of said spindle, hydraulic means for moving said carriage, a program control shaft, cams on said shaft, valves controlled by said cams, speed control means controlled by certain of said valves determining a fast idle speed, slower rough and finish grinding speeds and wheel truing speeds, means actuated by motions of said wheel carriage for turning said shaft by predetermined angular amounts at predetermined axial positions of said wheel carriage, means for moving said work carriage at predetermined times to feed the grinding wheel relative to work carried by said spindle, and means for terminating such feed independently for rough and finish grinding after predetermined amounts of feed and at a predetermined position of said wheel carriage.

9. A grinding machine comprising a bed, a work carriage having a rotary work spindle, a grinding wheel carriage mounted on said bed for rectilinear motion in the general direction of the axis of said spindle, hydraulic means for moving said carriage, a program control shaft, cams on said shaft, valves controlled by said cams, speed control means controlled by certain of said valves determining a fast idle speed, slower rough and finish grinding speeds and wheel truing speeds, means actuated by motions of said wheel carriage for turning said shaft by predetermined angular amounts at predetermined axial positions of said wheel carriage, means for moving said work carriage at predetermined times to relatively feed said grinding wheel and the work, and means controlled by said valves for changing the limits of such feed between rough and finish grinding.

10. A grinding machine comprising a bed, a work carriage having a rotary work spindle, a grinding wheel carriage mounted on said bed for rectilinear motion in the general direction of the axis of said spindle, hydraulic means for moving said carriage, a program control shaft, cams on said shaft, valves controlled by said cams, speed control means controlled by certain of said valves determining a fast idle speed, slower rough and finish grinding speeds and wheel truing speeds, means actuated by motions of said wheel carriage for turning said shaft by predetermined angular amounts at predetermined axial positions of said wheel carriage, means for moving said work and wheel carriage relatively at predetermined times to feed said grinding wheel against work carried by said spindle, means for individually limiting the extent of feed for rough and finish grinding, and means controlled by said valves for selecting such limit.

11. A grinding machine comprising a bed, a work carriage having a rotary work spindle, a grinding wheel carriage mounted on said bed for rectilinear motion in the general direction of the axis of said spindle, hydraulic means for moving said carriage, a program control shaft, cams on said shaft, valves controlled by said cams, speed control means controlled by certain of said valves determining a fast idle speed, slower rough and finish grinding speeds and wheel truing speeds, means actuated by motions of said wheel carriage for turning said shaft by predetermined angular amounts at predetermined axial positions of said wheel carriage, means for moving said work and wheel carriage relatively at predetermined times to feed said grinding wheel against work carried by said spindle, means for individually limiting the extent of feed for rough and finish grinding, means controlled by said valves for selecting such limit, and means controlled by the feed reaching such limits to condition said hydraulic means for the succeeding step in the machine cycle.

References Cited in the file of this patent
UNITED STATES PATENTS

| | | |
|---|---|---|
| 1,684,485 | Guild | Sept. 18, 1928 |
| 1,920,532 | Stevens | Aug. 1, 1933 |
| 2,360,462 | Arms | Oct. 17, 1944 |
| 2,429,830 | Ljunggren | Oct. 28, 1947 |